Jan. 2, 1962 D. S. STRADER 3,015,314
HYDRAULIC POWER STEERING ARRANGEMENT
Filed Jan. 12, 1959 2 Sheets-Sheet 1
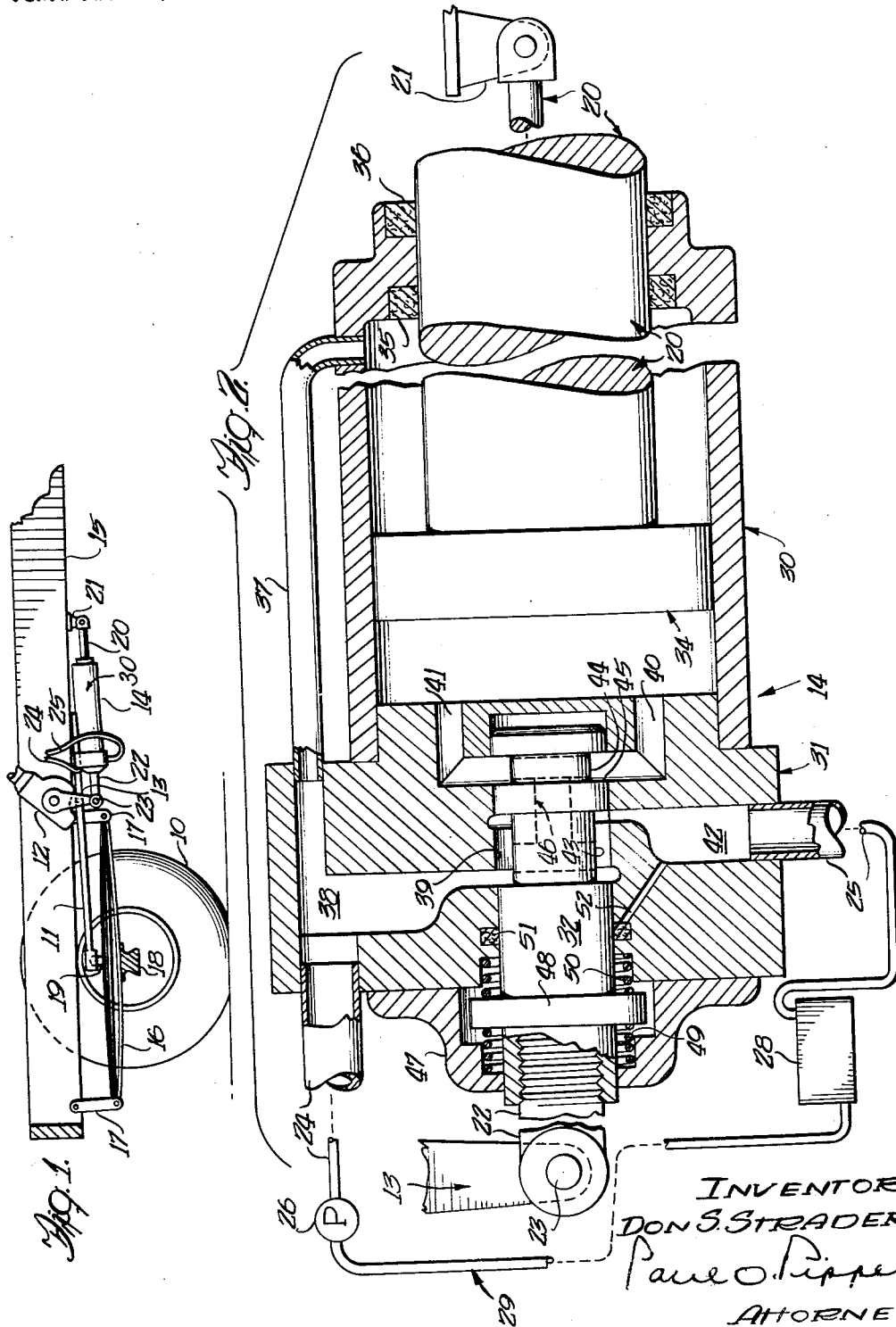
INVENTOR
DON S. STRADER
Paul O. Pippel
ATTORNEY

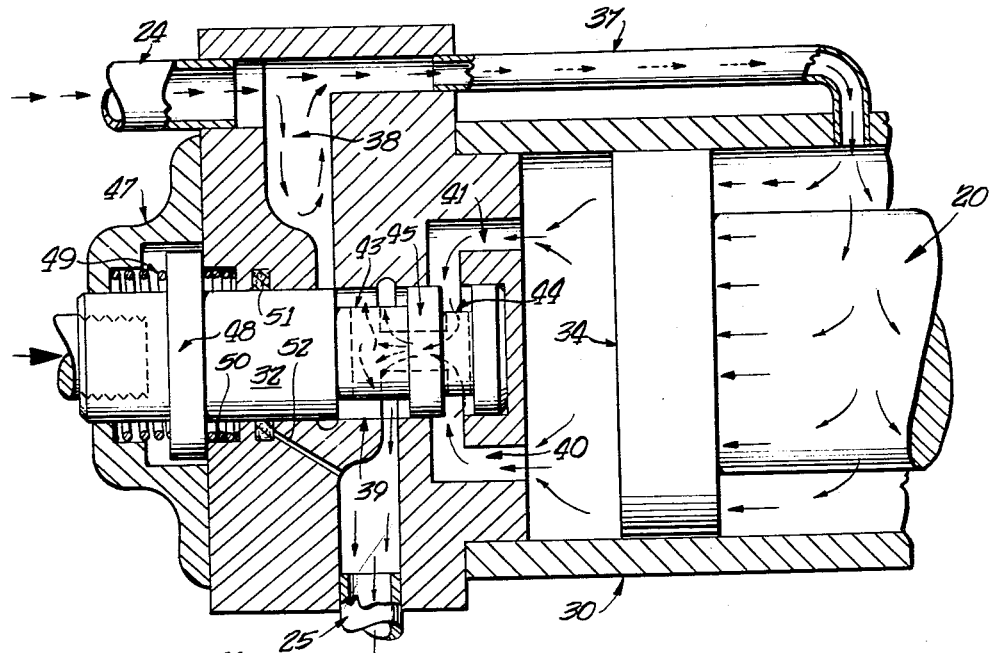
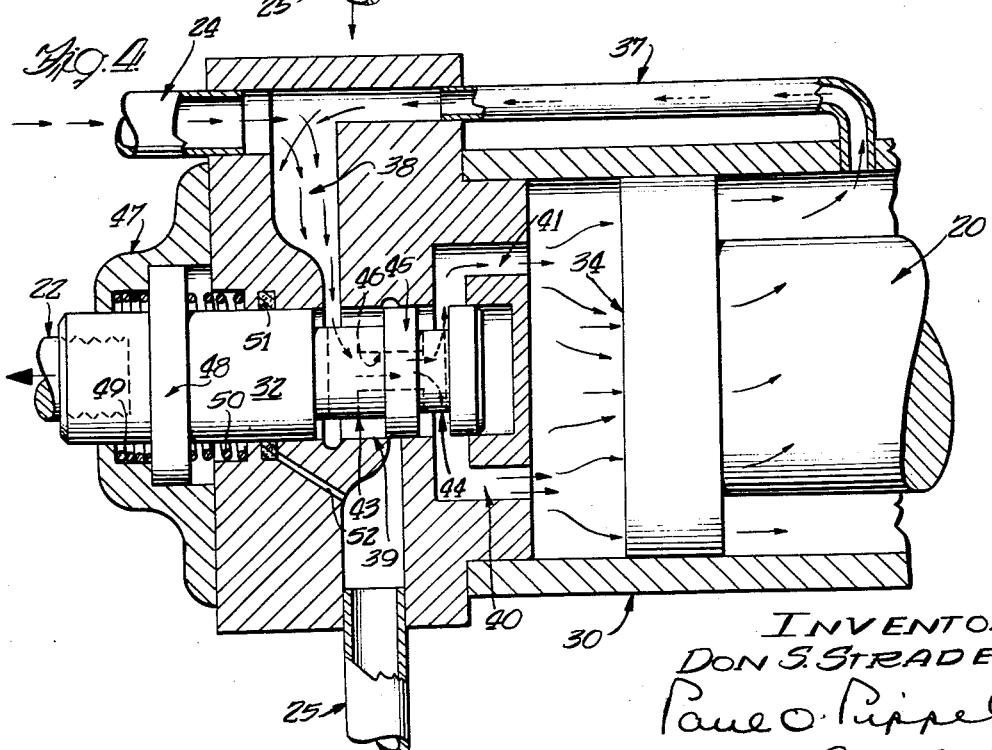
INVENTOR
DON S. STRADER
Paul O. Pippel
ATTORNEY

3,015,314
Patented Jan. 2, 1962

3,015,314
HYDRAULIC POWER STEERING
ARRANGEMENT
Don S. Strader, Mount Prospect, Ill., assignor to The Frank G. Hough Co., a corporation of Illinois
Filed Jan. 12, 1959, Ser. No. 786,425
3 Claims. (Cl. 121—41)

This invention relates generally to fluid pressure control means, and more specifically to an improved hydraulic fluid valve and motor arrangement for the steering system of a motor vehicle.

Whenever some power means such as a hydraulic motor of the reciprocating piston and cylinder type is used to aid the steering of a motor vehicle, the problem of providing equal effort in each direction that the wheels of the motor vehicle may be turned is encountered. The force applied by the motor to turn the wheels and the speed at which the motor turns the wheels should be the same in each direction. For a hydraulic fluid pump delivering fluid at a substantially constant pressure through a simple valve, the force and speed with which a piston and cylinder type motor is operated in each direction will not be the same due to the area of the piston rod which reduces the effective area upon the hydraulic fluid pressure acts in retracting the rod into the cylinder.

The object of the present invention is to provide a certain hydraulically operated means for assisting the operator of a motor vehicle in turning the steerable wheels thereof with the hydraulic means operating to provide substantially the same assistance in either direction of steering.

It is a further object of the present invention to provide a hydraulic fluid valve and reciprocating piston type motor arrangement which in operation will compensate for the area of the piston rod to provide for operation of the motor with the same force and at the same speed in either direction.

It is a further object of the present invention to provide a certain hydraulic valve construction carried on the head end of the cylinder of a reciprocating piston type hydraulic motor wherein the hydraulic motor is connected into a motor vehicle steering system and wherein the combined operation of the valve and motor will provide for substantially the same steering effort in each direction of steering.

Other objects and features of the present invention will be apparent upon a perusal of the following specification and drawings of which:

FIGURE 1 is a partial elevational view of a motor vehicle constructed according to the present invention;

FIGURE 2 is an enlarged cross sectional view of the motor and valve arrangement of the present invention with the remainder of the hydraulic circuit shown diagrammatically;

FIGURE 3 is an enlarged cross sectional view of the valve and motor arrangement of the present invention operated to one steering position, and FIGURE 4 is a view similar to FIGURE 3 with the invention operated to the other steering position.

The present embodiment is the preferred embodiment but it is understood changes can be made in the present embodiment by one skilled in the art without departing from the spirit and scope of the present invention.

For a general description of the present invention reference is made to the drawings. The steerable wheel 10 of the motor vehicle is connected through appropriate links such as link 11 and the hydraulic motor and valve assembly 14 to the steering column 12 carrying a suitable steering wheel (not shown) at the upper end thereof for turning the wheels 10. The steering column 12 at the lower end includes a gearing arrangement for pivoting the lever 13 which is connected to a valve spool extension 22. The hydraulic motor and valve assembly 14 of the subject invention is pivotally connected at the rod end thereof to the frame 15 of the vehicle. The link 11 of the steerable wheel is connected to the outside surface of the cylinder 30 of the hydraulic motor shown in FIGURE 1. The hydraulic motor, which is of the reciprocating piston type, is provided with a piston rod having a cross sectional area substantially equal to one-half of the area of the piston head. The head end of the motor which carries the hydraulic valve is constructed so that the valve spool is pivotally connected to the lever 13. The valve of the assembly 14 is biased to a neutral center position by two coiled springs, and in this position, hydraulic fluid under pressure delivered to the valve from the hydraulic pump is vented through the valve to the hydraulic fluid reservoir. In this position each end of the hydraulic motor is also vented to the hydraulic fluid reservoir. When a steering operation which projects the valve spool inwardly toward the hydraulic motor is made, the hydraulic fluid under pressure from the pump is delivered to the rod end of the hydraulic motor, and hydraulic fluid from the head end of the hydraulic motor is vented to the hydraulic fluid reservoir. The assembly 14 will then be retracted with the rod of the hydraulic motor moving inwardly of the cylinder thereof at a speed and force determined by the pressure of the hydraulic fluid delivered thereto and the area of the rod side of the piston head of the hydraulic motor. When the steering wheel is turned in a direction to cause the valve spool of the assembly 14 to be drawn outwardly from the assembly 14, hydraulic fluid under pressure is connected to each end of the hydraulic motor with fluid communication to the reservoir being blocked. The assembly 14 will then be extended with the piston rod moving outwardly relative to the hydraulic motor at a force and speed dependent upon the pressure of the hydraulic fluid delivered thereto and the effective area of the piston head of the hydraulic motor. As the cross sectional area of the piston rod of the hydraulic motor is one-half of the area of the piston head of the hydraulic motor, it may be seen that with the same hydraulic fluid pressure at both ends of the motor, the effective area of the piston head is substantially equal to one-half of the area of the piston head. Thus the hydraulic motor will be extended and retracted at the same speed and with the same force in either direction.

Turning next to a detailed description of the present invention continued reference is made to the drawings. Only a portion of the frame 15 of the motor vehicle constructed according to the present invention is shown. The frame 15 is supported on wheels such as wheel 10 by spring assemblies such as leaf spring assembly 16 secured to the frame 15 by means of links 17. An axle 18 is carried by the leaf spring assembly 16 on each side of the frame 15 and the axle 18 in turn carries the wheels 10. A steering arm 19 is secured to the wheel 10 for pivoting the wheel 10 about the kingpin. The steering column assembly 12 is secured to the frame 15 and is provided with a steering wheel (not shown) at the upper end thereof. The steering column assembly 12 has a lever 13 operatively carried thereon which is pivoted responsive to rotations of the steering wheel. The cylinder 30 of the hydraulic motor connects one end of link 11 which in turn is pivotally connected at its other end thereof to the steering arm 19 of the wheel 10.

The subject invention which is combined with steering means such as described above comprises a hydraulic motor and valve assembly 14. The member 20 is the piston rod of the hydraulic motor portion of the assembly. The end of the piston rod 20 is pivotally connected to a bracket 21 which in turn is secured to the frame 15.

The member 22 extending from the other end of the assembly 14 is an extension of the valve spool for the valve of the assembly 14. The end of the valve spool extension 22 is pivotally connected to the end of the lever 13 by means of a pin 23. Hydraulic fluid conduits 24 and 25 provide for the flow of hydraulic fluid to and from the assembly 14. Conduit 24 is connected between the high pressure side of a suitable hydraulic fluid pump 26 and the assembly 14. Hydraulic fluid conduit 25 is connected between the assembly 14 and a suitable hydraulic fluid reservoir 28. A further hydraulic fluid conduit 29 is connected between the reservoir 28 and the low pressure side of the hydraulic pump 26.

The assembly 14 comprises a cylinder 30 having the piston rod 20 slidably carried therein and a valve body 31 formed as the end cover for the open head end of the cylinder 30. The valve body 31 has a valve spool 32 slidably carried therein along the same axis of movement as the piston rod 20. The piston rod 20 is provided with a piston head 34 which is of an area substantially twice the cross sectional area of the piston rod 20. Sealing rings 35 and 36 carried in the rod end of the cylinder 30 prevent the leakage of hydraulic fluid from the cylinder 30. The rod end of the cylinder 30 is provided with a conduit 37 which is also connected into a passageway 38 in the valve body 31. Hydraulic fluid conduit 24 from the pump 26 is also connected into passageway 38 through the valve body 31. Passageway 38 in turn is connected into the valve bore 39 in the valve body 31. Two passageways 40 and 41 are formed in the valve body 31 and are connected between the head end of the cylinder 30 and the valve bore 39 inwardly of the passageway 38. Conduit 25 connected to the valve body 31 is disposed in free fluid communication with a passageway 42, which in turn is connected into the valve bore 39 between the connections of passageway 38 and passageways 40 and 41 thereto. The valve spool 32 is provided with two annular grooves 43 and 44 separated by a land 45. A passageway 46 is formed in the valve spool 32 and provides for free fluid communication between annular grooves 43 and 44 of the valve spool 32. The outer end of the valve spool 32 extends outwardly of the valve body 31 and is secured to one end of the extension 22. A cap member 47 is secured to the valve body 31 about the outer end of the valve spool 32. The cap 47 is provided with a cavity therein. The portion of the valve spool 32 disposed within the cavity of the cap 47 is provided with an annular flange 48. A pair of coiled springs 49 and 50 are positioned about the valve spool 32 one on each side of the annular flange 48. The spring 49 projects against the inner surface of the cavity in the cap 47, and the spring 50 projects against the valve body 31. The coiled springs 49 and 50 are in compression and bias the valve spool 32 to the neutral position shown in FIGURE 2. In the neutral position, land 45 of valve spool 32 is disposed between passageway 42 and passageways 40 and 41, and annular groove 43 interconnects passageways 38 and 42 in free fluid communication.

The valve body 31 further includes an annular groove carrying a fluid seal 51 about the valve spool 32 outwardly of passageway 38. Passageway 52 connects the annular groove carrying the fluid seal 51 to passageway 42 to permit the draining of any fluid accumulations from the annular groove carrying seal 51.

When the valve spool 32 is moved inwardly of the valve body 31 by a turning of the steering wheel, the valve spool 32 blocks passageway 38 as shown in FIGURE 3. In this operated position of the valve, high pressure fluid is delivered to conduit 24 through passageway 38, conduit 37, and to the rod end of the cylinder 30. Low pressure hydraulic fluid will flow from the head end of the cylinder 30 through passageways 40 and 41, into the portion of passageway 46 opening into annular groove 44, through passageway 46, into annular groove 43, passageway 42, and conduit 25 to the reservoir 28. The hydraulic motor will then be operated to change the position of the piston rod 20 inwardly of the moving cylinder 30 which in turn moves the connected link 11 to turn the wheel 10.

When the steering wheel is turned to move valve spool 32 outwardly of the assembly 14, land 45 is moved to block passageway 42 as shown in FIGURE 4. In this operated position of the valve, hydraulic fluid under pressure is applied to both sides of the piston head 34. Hydraulic fluid under pressure at conduit 24 is in free fluid communication with the rod end of the cylinder 30 through conduits 37. Hydraulic fluid under pressure in conduit 24 is also applied to the head end of the cylinder 30 through the following circuit passageway 38, annular groove 43, passageway 46 in the valve spool 32, annular groove 44 and passageways 40 and 41. Since the area of the piston head on the side opposite from the rod 20 is twice as large as the free area of the piston head on the other side of the rod 20, the hydraulic motor will be operated to change the position of the piston rod 20 outwardly of the moving cylinder 30 which in turn moves the connected link 11 to turn the wheel 10 in another direction.

Considering that in the operation of the present invention the pump 26 delivers fluid at a constant volume, it may be seen that the speed and force with which the rod 20 is moved is a function of the effective areas of the piston head 34 upon which the hydraulic fluid acts. As shown in FIGURE 3 the hydraulic fluid acts upon an area which is the area of the head 34 minus the cross sectional area of the rod 20. Substantially no hydraulic pressure is present on the other side of the head 34 since that side is vented to the reservoir 28. In the operated position shown in FIGURE 4 hydraulic fluid under pressure is applied to both sides of the head 34. However, since the area of the head 34 is twice the cross sectional area of the rod 20, the effective area again is equal to the area of the piston head 34 minus the cross sectional area of the rod 20, and the rod 20 will be moved at the same speed and with the same force in both directions.

Having described the invention what is considered new and desired to be protected by Letters Patent is:

1. A hydraulic motor and valve arrangement for a vehicle steering system comprising, a hydraulic cylinder, a piston and rod slidably carried in said cylinder, said piston having an area which is substantially equal to twice the cross-sectional area of said rod, a valve body mounted on the head end of said hydraulic cylinder, a valve bore formed in said valve body and connected in free fluid communication with the head end of said hydraulic cylinder, a hydraulic fluid passageway connected between said valve bore and the rod end of said cylinder, a high pressure hydraulic fluid inlet formed in said valve body and connected to said passageway in free fluid communication therewith, a low pressure hydraulic fluid outlet formed in said valve body and connected to said valve bore in free fluid communication therewith at a longitudinal position of said valve bore between the connection of said passageway to said valve bore and the connection of said valve bore to said head end of said hydraulic cylinder, a valve spool slidably carried in said valve bore, two annular grooves formed in said valve spool and separated by a land, a second hydraulic fluid passageway formed in said valve spool between said two annular grooves; said two annular grooves, said land, and the connections of said first passageway and said low pressure hydraulic fluid outlet to said valve bore relatively positioned so that in one longitudinal position of said valve spool relative to said valve bore, said low pressure hydraulic fluid outlet is blocked by said land, and said first passageway and the head end of said hydraulic cylinder are interconnected in free fluid communication through said second passageway, so that in a second position of said valve spool relative to said valve bore, said first passageway is connected to said low pressure hydraulic fluid outlet through one of said annular grooves, and the head end of said hydraulic cylinder is connected to said low pressure hydraulic fluid outlet through said second passageway, and so that in a third position of said valve spool relative to said valve bore said first passageway is blocked by said valve spool, and the head end of said hydraulic cylinder is connected to said low pressure hydraulic fluid outlet through said second passageway.

2. In a hydraulic motor and valve arrangement for a vehicle steering system as claimed in claim 1, wherein said valve bore and valve spools are relatively formed so that said first position of said valve spool corresponds to the outwardmost position of said valve spool, said second position of said valve spool corresponds to a partially inward position of said valve spool, and said third position of said valve spool corresponds to the inwardmost position of said valve spool.

3. In a hydraulic motor and valve arrangement for a vehicle system as claimed in claim 1, wherein the outer portion of said valve spool is provided with an annular flange, and a pair of coiled compressed springs, each of said coiled springs carried about said valve spool and abutting opposite sides of said annular flange and portions of said valve body to bias said valve spool to said second position.

References Cited in the file of this patent
UNITED STATES PATENTS

| | | |
|---|---|---|
| 2,702,529 | Doerfner | Feb. 22, 1955 |
| 2,719,511 | Presnell | Oct. 4, 1955 |
| 2,757,748 | MacDuff | Aug. 7, 1956 |
| 2,815,737 | Gold et al. | Dec. 10, 1957 |